US000001988B1

(19) United States

(12) Statutory Invention Registration (10) Reg. No.: US H1988 H

Kim et al. (43) Published: Sep. 4, 2001

(54) METHOD TO PRODUCE GAMMA TITANIUM ALUMINIDE ARTICLES HAVING IMPROVED PROPERTIES

(75) Inventors: Young-Won Kim, Dayton; Dennis M. Dimiduk, Beavercreek, both of OH (US)

(73) Assignee: The United States of America as represented by the Secretary of the Air Force, Washington, DC (US)

( * ) Notice: This patent is subject to a terminal disclaimer.

(21) Appl. No.: 09/111,258

(22) Filed: Jun. 30, 1998

(51) Int. Cl.[7] ..... C22F 1/18

(52) U.S. Cl. ..... 148/671; 148/669; 148/670

(58) Field of Search ..... 148/669, 670, 148/671

(56) References Cited

U.S. PATENT DOCUMENTS

| | | |
|---|---|---|
| H1659 | 7/1997 | Semiatin et al. . |
| 5,080,860 | 1/1992 | Huang . |
| 5,205,875 | 4/1993 | Huang . |
| 5,226,985 | 7/1993 | Kim et al. . |
| 5,417,781 | 5/1995 | McQuay et al. . |
| 5,558,729 | 9/1996 | Kim et al. . |
| 5,653,828 | 8/1997 | Zhao et al. . |

*Primary Examiner*—Charles T. Jordan
*Assistant Examiner*—Aileen J. Baker
(74) *Attorney, Agent, or Firm*—Charles E. Bricker; Thomas L. Kundert

(57) ABSTRACT

Methods are presented to produce duplex (DP) microstructures, nearly lamellar (NL) microstructures, and fully TMT lamellar (TMTL) microstructures in gamma titanium aluminide alloy articles. The key step for obtaining a specific type of microstructure is the post-hot work annealing treatment at a temperature in a specific range for the desired microstructure. The annealing temperatures range from $T_e$+100° C. to Tα−25° C. for duplex (DP) microstructures, from Tα−25° C. to Tα−5° C. for nearly lamellar (NL) microstructures, and from Tα to Tα+60° C. for fully TMT lamellar (TMTL) microstructures, where $T_e$ is the titanium-aluminum eutectoid temperature of the alloy and Tα is the alpha transus temperature of the alloy. The times required for producing specific microstructures range from 2 min to 15 hours depending on microstructural type, alloy composition, annealing temperature selected, material section size, and desired grain-size. The heating rate to the post-hot work annealing treatment is critical and must be fast enough to avoid compositional segregation (in the two-phase field) and uneven grain growth. Cooling schemes and rates after the annealing treatments are determined according to the microstructural features of interest, and their stability.

24 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD TO PRODUCE GAMMA TITANIUM ALUMINIDE ARTICLES HAVING IMPROVED PROPERTIES

RIGHTS OF THE GOVERNMENT

The invention described herein may be manufactured and used by or for the Government of the United States for all governmental purposes without the payment of any royalty.

BACKGROUND OF THE INVENTION

The present invention relates to methods to produce refined microstructures in gamma titanium aluminide alloys.

It is known that as aluminum is added to titanium metal in greater and greater proportions, the crystal form of the resulting titanium aluminum composition changes. Small percentages of aluminum go into solid solution in titanium and the crystal form remains that of alpha titanium. At higher concentrations of aluminum, including about 25 to 35 atomic %, an intermetallic compound, $Ti_3Al$, is formed. The $Ti_3Al$ has an ordered hexagonal crystal form called alpha-2. At still higher concentrations of aluminum, including about 49 to 60 atomic %, another intermetallic compound, TiAl, is formed having an ordered, face-centered tetragonal crystal form called gamma.

The alloy of titanium and aluminum having a gamma crystal form, and a stoichiometric ratio of approximately one, is an intermetallic compound having a high modulus, a low density, a high thermal conductivity, favorable oxidation resistance, and good creep resistance. It has been shown that TiAl has the best modulus of any of the titanium-based alloys. Not only is the TiAl modulus higher at higher temperature, but the rate of decrease of the modulus with temperature increase is lower for TiAl than for the other titanium alloys. Moreover, the TiAl retains a useful modulus at temperatures above those at which the other titanium alloys become useless. Alloys which are based on the TiAl intermetallic compound, so-called "gamma" TiAl alloys, have attractive attributes for use where high modulus is required at high temperatures and where good environmental protection is also required.

One of the characteristics of TiAl alloys which limits their actual application to such uses is a brittleness which is found to occur at room temperature (RT). Also, the strength of the TiAl alloys at RT needs improvement before the TiAl intermetallic compound can be exploited in many structural component applications.

It is known that the addition of a small quantity of boron to gamma titanium aluminide improves the RT ductility of the intermetallic compound. U.S. Pat. No. 5,080,860, issued Jan. 14, 1992, to Shyh-Chin Huang, discloses that the addition of 0.5 to 2 atomic percent boron to gamma titanium aluminide alloys improves the castability and the RT ductility of the intermetallic compound. However, the addition of a lesser quantity of boron, i.e., 0.1 to 0.2 atomic percent boron, to gamma titanium aluminide alloys did not provide any significant improvement in the values of the tensile and ductility properties. U.S. Pat. No. 5,205,875, issued Apr. 27, 1993, to Shyh-Chin Huang, discloses that cast and forge processing together with the addition of 0.1 to 0.2 atomic percent boron to gamma titanium aluminide alloys does yield a ductility advantage.

The properties of alloys based on gamma titanium aluminide depend strongly on microstructure, as well as composition. It has been shown that the most desirable microstructures are based on the lamellar structure which consists of alternating layers of TiAl plates and $Ti_3Al$ plates. Such structures are commonly called "fully-lamellar microstructure" (FL) and can be produced: (1) in cast alloys during cooling after solidification or (2) in wrought processed alloys during cooling after holding in the so-called high-temperature alpha field. In either case, however, the resulting FL microstructures consist of large grain sizes which are typically larger than 400 $\mu$m. Investigations have shown that these large grained FL materials exhibit poor tensile properties, although their resistance to fracture initiation/growth and high-temperature creep are quite remarkable. This unbalanced relationship has attracted a great deal of attention for the last several years. A few methods have been proposed or introduced to improve the balance of properties by reducing the FL grain sizes.

In casting alloys, $TiB_2$ additions were found to reduce the cast lamellar grain size drastically when the amounts exceed a certain level, that is, about 0.8 vol % $TiB_2$ (about 0.9 at % boron). "XD" alloys such as Ti-(45 or 47)Al-2Mn-2Nb-0.8 vol % $TiB_2$ are typical examples in that the as-cast material contains randomly oriented fully-lamellar grains having a uniform grain size of about 150 $\mu$m and "jagged" grain boundaries.

For wrought-processed alloys, grain size control has been attempted through several different routes. Two thermomechanical processing routes, (1) high-temperature extrusion and (2) forging followed by heat treatment, were disclosed in U.S. Pat. No. 5,226,985, issued Jul. 13, 1993 to Y-W. Kim and D. Dimiduk. The first method is referred to as a thermomechanical process (TMP) and comprises shaping the article by extrusion or hot die forging, rolling or swaging, followed by a stabilization aging treatment. In this process, shaping is carried out at a temperature in the approximate range of 0° to 20° C. below the alpha-transus temperature ($T_\alpha$) of the alloy. The alpha-transus temperature generally ranges from about 1300° to about 1400° C., depending on the alloy composition. $T_\alpha$, decreases with decreasing Al. The alpha-transus temperature has also been shown to decrease with many interstitial (e.g., O and C) and substitutional (e.g., Cr, Mn, Ta and W) alloying elements. $T_\alpha$ can be determined relatively routinely by standard isothermal heat treatments and metallography, or by Differential Thermal Analysis (DTA), provided the material is homogeneous.

The aging temperature can range between 750° and 1100° C., depending on the specific use temperature contemplated, for at least one hour and up to 300 hours. The TMP method provides a product with a fine lamellar microstructure.

The second method is referred to as a thermomechanical treatment (TMT), which comprises hot working at temperatures well below the alpha-transus ($T_\alpha$) with subsequent heat treatment near the alpha-transus followed by a stabilization aging treatment. Where shaping is by extrusion, extrusion is carried out at a temperature in the approximate range of $T_e$−130° C. to $T_\alpha$−20° C. Where shaping is by hot die forging, rolling or swaging, such shaping is carried out at a temperature in the approximate range of $T_e$−130° C. to $T_\alpha$−20° C., at a reduction of at least 50% and a rate of about 5–20 mm/min. Where shaping is by isothermal forging, such shaping is carried out at a temperature in the approximate range of $T_e$−130° C. to $T_e$+100° C., at a reduction of at least 60% and a rate of about 2–7 mm/min. After hot working, the article is heat treated at a temperature in the approximate range of $T_\alpha$−5° C. to $T_\alpha$+20° C. for about 15 to 120 minutes. Following such heat treatment, the article is cooled and given an aging treatment. The TMT method provides a product having randomly oriented lamellar microstructures which appear similar to those in cast XD material.

A modification to the TMT forging+heat treating method is disclosed in SIR H1659, issued Jul. 1, 1997, to S. Semiatin, D. Lee and D. Dimiduk. This method provides an alternative for controlling grain size which is more suited to production heat treating, especially for thick cross-sections.

TMP processing was further developed to include wider ranges of temperatures and detailed extrusion conditions and parameters in U.S. Pat. No. 5,417,781, issued May 23, 1995, to P. McQuay, D. Dimiduk and Y-W. Kim. McQuay et al disclose four methods: The first of these methods comprises the steps of: (a) heat treating an alloy billet or preform at a temperature in the approximate range of $T_\alpha$ to $T_\alpha$+100°° C. for about 0.5 to 8 hours, (b) shaping the billet at a temperature between $T_\alpha$−30° C. and $T_\alpha$ to produce a shaped article, and (c) aging the thus-shaped article at a temperature between about 750° and 1050° C. for about 2 to 24 hours. The second method comprises (a) rapidly preheating an alloy preform to a temperature in the approximate range of $T_\alpha$ to $T_\alpha$+100° C., (b) shaping the billet at a temperature between $T_\alpha$ and $T_\alpha$+100° C. to produce a shaped article, and (c) aging the thus-shaped article at a temperature between about 750° and 1050° C. for about 2 to 24 hours. The preform is held at the preheat temperature for 0.1 to 2 hours, just long enough to bring the preform uniformly to the shaping temperature. The third method comprises the steps of: (a) heat treating an alloy billet or preform at a temperature in the approximate range of $T_\alpha$ to $T_\alpha$+100° C. for about 0.5 to 8 hours, (b) rapidly heating the preform to shaping temperature, if the shaping temperature is greater than the heat treatment temperature, (c) shaping the preform at a temperature between $T_\alpha$ and $T_\alpha$+100° C. to produce a shaped article, and (d) aging the thus-shaped article at a temperature between about 750° and 1050° C. for about 2 to 24 hours. The fourth method comprises the steps of: (a) heat treating an alloy billet or preform at a temperature in the approximate range of $T_\alpha$−40° C. to $T_\alpha$ for about 0.1 to 2 hours, (b) rapidly preheating the preform to shaping temperature, (c) shaping the preform at a temperature between $T_\alpha$ and $T_\alpha$+100° C. to produce an shaped article, and (d) aging the thus-shaped article at a temperature between about 750° and 1050° C. for about 2 to 24 hours.

These methods generate unique lamellar microstructures consisting of randomly oriented lamellar colonies, with serrated grain boundaries. Gamma titanium aluminide alloys with such structure have the requisite balance of properties for moderate and high temperature aerospace applications: high specific strength, stiffness, fracture resistance and creep resistance in the temperature range of room temperature to about 950° C.

Another method disclosed in U.S. Pat. No. 5,558,729, issued Sep. 24, 1996, to Y-W. Kim and D. Dimiduk, describes an alloy modification to expand and lower the high-temperature two-phase (alpha and beta) field. In this case, the annealing treatment is done in the two-phase field, instead of the single-phase alpha field, which results in reduced grain size due to the competition between the two phases. The resulting, fine lamellar microstructures are called refined fully-lamellar (RFL) microstructures and their grain sizes range relatively widely from 100 to 500 $\mu$m.

While the methods described above for refining lamellar grain sizes are valuable contributions to the art, each of the methods has drawbacks, in that the processing windows are relatively narrow, and are not particularly tolerant of derivations from the prescribed windows. In general, they are perceived as being insufficiently "robust" for large scale commercial production of gamma alloy components.

Accordingly, it is an object of the present invention to provide improved methods for producing articles of gamma titanium aluminide alloys.

Other objects and advantages of the invention will be apparent to those skilled in the art.

SUMMARY OF THE INVENTION

In accordance with the invention, there are provided improved methods for producing articles of gamma titanium aluminide alloy having improved properties. These methods comprise post-hot work (HW) processing which provide specific microstructures.

The methods of this invention comprise hot working of alloy ingots or consolidated powder billets, generally in the hot isostatically pressed (HIP'd) condition, with subsequent annealing treatments at specific temperature ranges characteristic of each microstructure, followed by specific cooling schemes and then stabilization aging treatments. The hot working includes isothermal forging, hot-die forging, extrusion, rolling or any combination thereof. Hot working can be carried out at temperatures ranging from about $T_e$−230° C. to $T_\alpha$−10° C. As noted previously, $T_e$ is about 1130° C. Extrusion rates of 0.5–3.0 cm/second are recommended while rates of 1–15 mm/min for isothermal forging and 5–30 mm/sec for hot die forging are suitable.

The methods of this invention can be used to produce duplex (DP) microstructures, nearly lamellar (NL) microstructures, and fully TMT lamellar (TMTL) microstructures. The key step for obtaining a specific type of microstructure is the post-hot work annealing treatment at a temperature in a specific range for the desired microstructure. The annealing temperatures range from $T_e$+100° C. to Tα−25° C. for duplex (DP) microstructures, from Tα−25° C. to Tα−5° C. for nearly lamellar (NL) microstructures, and from Tα to Tα+60° C. for fully TMT lamellar (TMTL) microstructures. The times required for producing specific microstructures range from 2 min to 15 hours depending on microstructural type, alloy composition, annealing temperature selected, material section size, and desired grain-size. The heating rate to the post-hot work annealing treatment is critical and must be fast enough to avoid compositional segregation (in the two-phase field) and uneven grain growth. The fast heating (FH) can be done by putting the sample into a furnace at the annealing temperature. Cooling schemes and rates after the annealing treatments are determined according to the microstructural features of interest, and their stability. The annealing treatment can be carried out in any atmosphere; however, it can be done most effectively and conveniently in air.

DETAILED DESCRIPTION OF THE INVENTION

The titanium-aluminum alloy compositions suitable for use in the invention are those alloys containing about 40 to 50 atomic percent Al (about 27 to 36 weight %), and about 0.05 to 1.0 atomic percent boron, balance Ti. The methods of this invention are applicable to the entire composition range of two-phase gamma alloys which can be formulated as multi-component alloys:

Ti-(45.0–49)Al-(0–3)X-(0–6)Y-(0.05–1.0)B (in at %)

wherein X is Cr, Mn, V or any combination thereof, and Y is Nb, Ta, W, Mo, Zr, Hf, or the like or any combination thereof. A presently preferred composition has the formula:

Ti-(46–47.5)Al-(1–3)Cr-(2–4)Nb-(0–0.3)W-(0.1–0.5)B (in at %)

The alpha-transus temperature ($T_\alpha$) of these alloys ranges from about 1320° to about 1380° C., depending on the alloy composition, and can be quite accurately determined by differential thermal analysis (DTA) and metallographic examinations.

Also useful are the above alloys with additions of small amounts (0.05–0.5 at %) of C, Si, N, P, Se, Te, Ni, Fe, Ce, Er, Y, Ru, Sc or Sn, or any combination thereof.

Examples of suitable alloy compositions are shown in Table I, below, together with their alpha-transus temperatures:

TABLE I

| Alloy | Composition (atomic %) | $T_\alpha$ (° C) |
|---|---|---|
| Ti—46Al-xB | Ti—46Al—0.2O—0.3B | 1330 |
| Ti—47Al-yB | Ti—47Al—0.18O—(0.03–0.5,0.7,1.0,1.5,2.5)B | 1360 |
| Ti—48Al-zB | Ti—48Al—0.19O—(0.5,1.5)B | 1380 |
| K1 | Ti—47.2Al—2Cr—0.5V—0.2Ni—3.5Nb—0.16O—0.2B | 1360 |
| K2 | Ti—46.8Al—2Cr—4.0Nb—0.17O—0.28B | 1345 |
| K5b | Ti—46.3Al—2Cr—3.0Nb—0.2W—0.15O—(0.1–0.5)B | 1325 |
| K5SB | Ti—46.2Al—1.8Cr—3.0Nb—0.26W—0.2Si—0.15O—0.1B | 1320 |
| K5WSB | Ti—46.5Al—1.9Cr—3.0Nb—0.5W—0.2Si—0.16O—0.12B | 1340 |
| K7 | Ti—47.1Al—1.5Cr—0.5Mn—2.5Nb—0.16O—0.18B | 1355 |
| K8B | Ti—46.1.1Cr—3.9Nb—0.22W—0.15O—0.09B | 1335 |
| KDCBS | Ti—46.5Al—2Cr—2.5Nb—0.25W—0.22C—0.15Si—0.15O—0.1B | 1320 |

Figure 1:
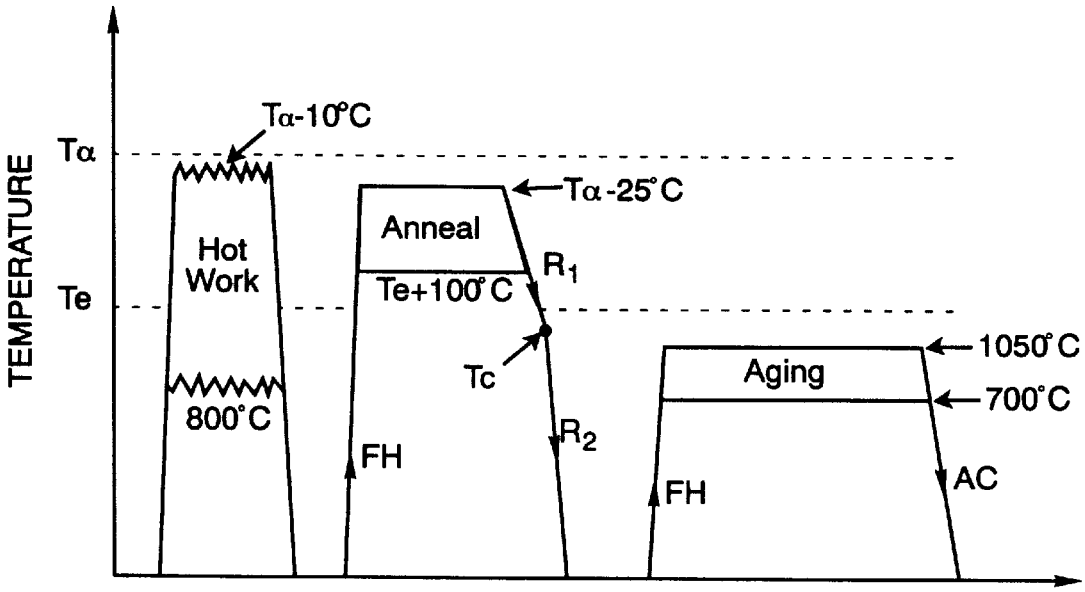
FIG. 1 is a schematic illustration of one method for obtaining duplex microstructure.
Figure 2:
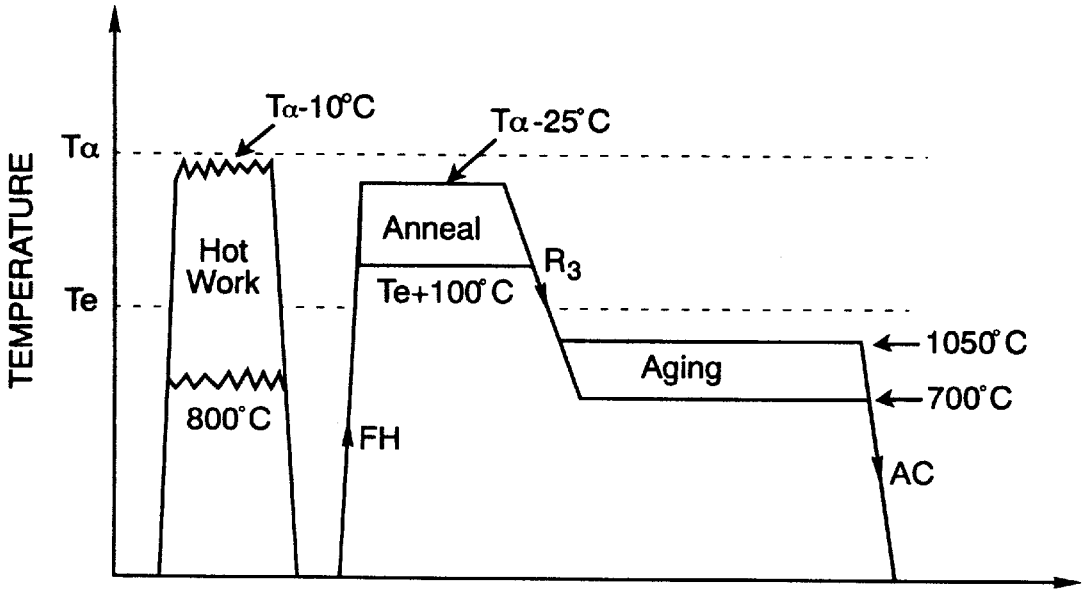
FIG. 2 is a schematic illustration of another method for obtaining duplex microstructure.

The process for producing uniform, fine duplex microstructures consists of hot working, annealing, and either indirect aging, as shown in FIG. 1, or direct aging, as shown in FIG. 2. The annealing treatment is conducted at an annealing temperature ($T_a$) in the range of $T_a$=$T_e$+100° C. to $T_\alpha$−25° C. for a time ranging from 10 minutes to 15 hours, depending on alloy composition, material section size, annealing temperature, desired distribution of microstructural constituents, and grain morphology and size. For alloy K7, $T_a$ ranges from 1230° C. to 1325° C., and a duplex microstructure obtained by annealing at 1300° C. for 2 hours. Cooling rates and methods are critical for fine details of microstructural features and the resulting mechanical properties. For indirect aging, two cooling rates ($R_1$ and $R_2$) are employed. $R_1$ is used for initial cooling from $T_a$ to $T_c$, and then a more rapid rate $R_2$ is used from $T_c$ to room temperature (RT). $T_c$ is the temperature at which the cooling rate is increased so that coarsening of second phase(s), such as alpha-2 and beta, is reduced or suppressed. $T_c$ ranges from $T_a$ down to about 700° C. The initial cooling rate $R_1$ ranges from 5° to 1000° C./min, with air cooling (AC) included. Reducing $R_1$, or lowering $T_c$ for a given $R_1$, results in reduced strength. Cooling rate $R_2$ ranges from $R_1$ to water quenching (WQ), including oil quenching (OQ). In general, AC is preferred for $R_2$. Cooling rates faster than AC can be employed only when the articles will not crack during quenching. The articles are then given an aging treatment at a temperature in the range of 700° to 1050° C. for about 1 to 150 hours, depending on desired microstructural features, their stability and desired mechanical properties, followed by air cooling. The direct aging process employs an annealing treatment followed by cooling at $R_3$ directly to an aging temperature. Both annealing and aging conditions are the same as for indirect aging. Cooling rate $R_3$ is the same as $R_1$, ranging from 5° to 1000° C./min, which can be achieved either by controlled cooling in the furnace or by transferring the article to another furnace or to a salt bath at a preset temperature.

The resulting fine duplex microstructures consist of three or four phases: gamma grains as the major phase, alpha-2 plates/particles, beta-phase grains/particles and titanium boride particles/plates, depending on alloy composition. The boride phases are present when the alloys contain more than 0.05 atomic % boron. The phase(s)can be identified from contrast variations in SEM micrographs. The gamma grain sizes range from 5 to 40 μm depending on composition, hot-working temperature, the amount of deformation, annealing temperature and annealing time. In general, the beta phase, of either plate or particle form, ranges in size from 1 to 10 μm, and alpha-2 particles/plates range in size from 0.5 to 10 μm. In alloy K7, the smallest average gamma grain size obtained was 5–8 μm when annealed at temperatures between 1260° and 1320° C. For a given annealing time, the higher the cooling rate or the $T_c$, the more saturated the composition of each phase and finer the alpha particles and plates become, resulting in increased strength.

Figure 3:
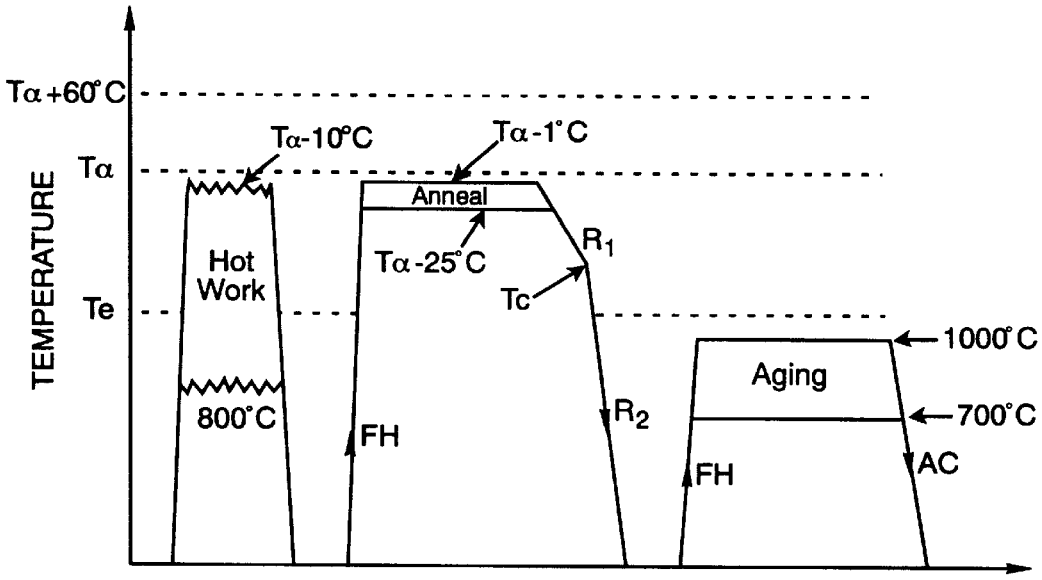
FIG. 3 is a schematic illustration of one method for obtaining nearly lamellar microstructure.
Figure 4:
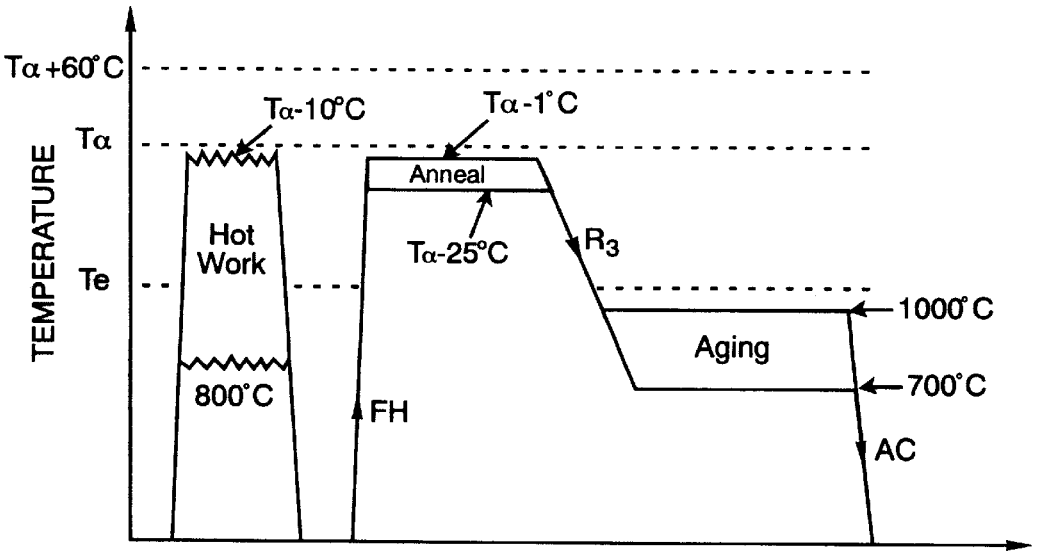
FIG. 4 is a schematic illustration of another method for obtaining nearly lamellar microstructure.

The methods to produce nearly-lamellar (NL) microstructures from gamma alloys containing boron are essentially the same as those for duplex microstructures, except for the annealing temperatures and conditions, as shown in FIGS. 3 and 4. Lamellar microstructures consist of predominantly lamellar grains and small volume fractions (<10 vol %) of fine gamma grains. The gamma grains can be present along the grain boundaries or randomly distributed depending on alloy composition, annealing temperature and time, and cooling rate. For producing NL structures via indirect aging, an annealing treatment is carried out at a temperature in a temperature range from Tα−1° C. to Tα−25° C. for a time ranging from 0.5 to 10 hours. As in producing duplex structures, the second cooling begins at $T_c$ which varies from the selected annealing temperature ($T_a$) to 700° C. The higher the value of $T_c$ the finer is the resulting microstructure for a given cooling rate $R_1$. When $T_c$=$T_a$, tensile strengths are highest for a constant $R_2$ value. For direct aging, the faster the $R_3$ the finer are the lamellar spacing, beta phase particles, and alpha-2 particles.

Figure 5:
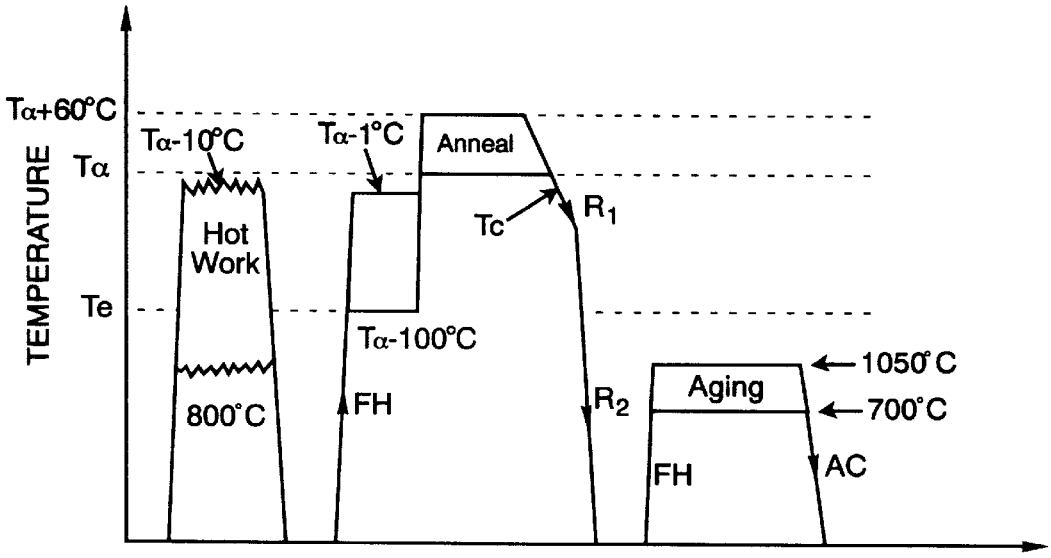
FIG. 5 is a schematic illustration of one method for obtaining fully lamellar microstructure.
Figure 6:
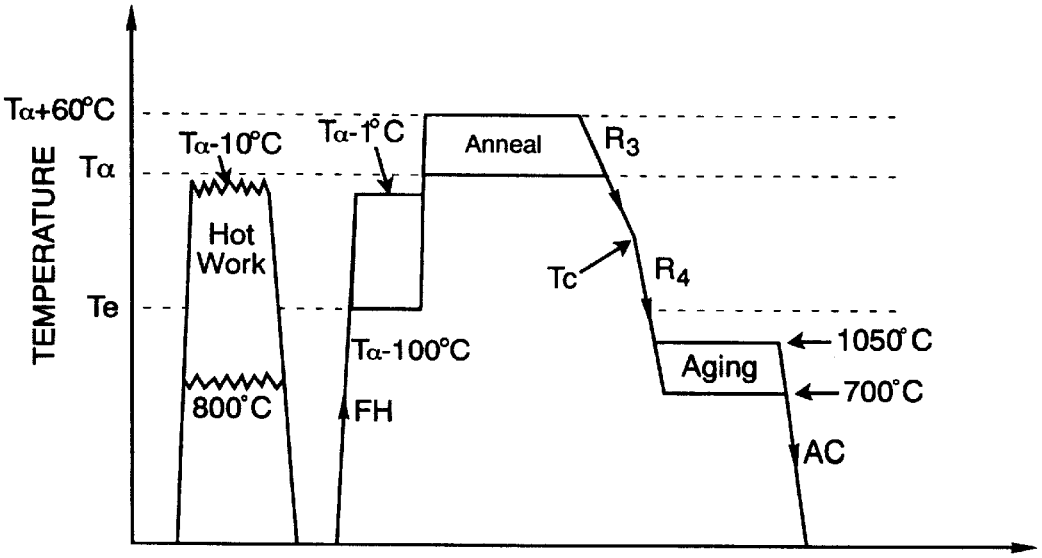
FIG. 6 is a schematic illustration of another method for obtaining fully lamellar microstructure.

The methods to produce TMTL lamellar microstructures are different from those for the duplex or NL microstructures. The hot-working conditions and parameters are the same as those for duplex processing. The articles are then heated to the annealing temperature either directly or via a pre-anneal treatment (FIGS. 5 and 6). The pre-anneal treatment is aimed at producing a uniform temperature in the sample, and is conducted in the ($\alpha+\gamma$) phase field at a temperature between $T\alpha-1°$ C. and $T\alpha-100°$ C. for a time ranging from 1 minute to 2 hours, depending on the section size and alloy composition. To minimize segregation, however, a lower temperature is recommended to be selected. A minimum annealing time or direct heating is preferred if compositional segregation and nonuniform grain growth are of concern. An excessive pre-anneal treatment results in compositional segregation and/or nonuniform grain growth which will cause considerable local variations in $T_\alpha$. The subsequent heating to the annealing temperature should be made at a rate faster than 20° C./min. The fastest heating rate, which will result in the most controlled microstructure, can be achieved by transferring the sample into a furnace at the desired annealing temperature. The annealing temperatures range from $T\alpha$ to $T\alpha+60°$ C., and annealing times can range from 1 minute to 10 hours, depending on alloy composition, sample dimensions, desired microstructural features including grain size, and degree of desired equilibrium. Unlike conventional gamma alloys, such as Ti-48A1-2Cr-2Nb, the fully TMTL grain size is readily refined down to 50 $\mu$m in the boron-containing wrought alloys, and the grain size decreases with increasing boron content for a given annealing time or temperature. The TMTL microstructures are characterized by randomly oriented lamellar colonies with ragged or poorly defined grain boundaries (GB). The effective grain refinement for an average grain size (GS) of 150 $\mu$m or finer can be achieved with the additions of 0.15 at % or higher boron contents for alloy K5B or 0.2 at % or higher boron amounts for the binary alloys.

One important aspect for TMTL microstructures is that the grain size is essentially fixed for a given composition for a wide range of annealing times as well as temperatures. A typical grain size, characteristic of a given boron content for an alloy composition, is reached after a short period (as short as 1.5 min) of holding at an annealing temperature, and its further growth is extremely sluggish.

The post-anneal cooling conditions are critical for obtaining perfect TMTL lamellar structures, controlling lamellar spacing, and controlling grain boundary morphology. For indirect aging, as shown in FIG. 5, the cooling rate, $R_1$, from the annealing temperature ($T_a$) to $T_c$ ranges from 5° C./min to faster than AC, depending on grain size and sample thickness. Higher cooling rates may result in disturbed lamellar microstructures, such as Widmanstätten, and massively transformed gamma microstructures depending on composition and grain size. The maximum cooling rate for perfect TMTL lamellar structures is a function of boron content, annealing time and grain size, with the rates being higher for finer grain sizes and/or higher boron contents. In general, the maximum cooling rate is faster than AC.

The $T_c$ ranges from the temperature where the formation of lamellar structures during cooling is completed ($T_L$) to RT. The $T_L$ decreases with increasing $R_1$, being a temperature close to 1270° C. for $R_1$=60° C./min for alloys containing about 47 at % Al. Increases of $R_1$ up to some threshold result in the formation of finer or thinner lamellae. During cooling below $T_L$, the lamellar spacing ($\lambda_L$) coarsens thermally. Thus, in order to maintain the lamellar spacing as fine as possible, it is necessary to employ the maximum $R_1$ rate, and to suppress coarsening, it is necessary to cool the sample at a fastest possible, $R_2$ rate, which ranges from 100° C./min to WQ including AC and OQ.

The variations of cooling rate result in not only different lamellar spacings but also different spacing distributions. Air cooling from the annealing temperature produces a uniformly fine spacing of 0.4 $\mu$m while furnace cooling to just below $T_L$ and then AC results in a coarse, nonuniform lamellar spacing of 1.2 $\mu$m alloy K7.

For direct aging lamellar processing, as shown in FIG. 6, $T_c$ can vary from $T_a$ to an aging temperature and the $R_3$ range is the same as $R_1$ in the indirect aging scheme. The second cooling rate, $R_4$, ranges from $R_3$ to the cooling rate corresponding to a direct quenching, that is, a quick transfer of the sample from $T_c$ to another furnace at a selected aging temperature.

Tensile property measurements were carried out for alloys K1, K2 and K7 after selected heat treatment conditions which generated various microstructures, including near gamma (NG), duplex (DP), nearly-lamellar (NL) and TMT lamellar (TMTL) types. Several different cooling rates were employed in the testing. Table II, below, lists tensile properties of alloy K7 (containing 0.17 at % B) in duplex (K7DP) and various TMT (K7TMT) heat treatment conditions and under various cooling conditions:

TABLE II

Heat Treatments vs Tensile Properties of Alloy K7 at SR = $1 \times 10^{-3}s^{-1}$

| | Heat Treatment (° C./Time/ Cooling) | Test T (° C.) | YS (Mpa) | UTS (Mpa) | Yield Strain (%) | Plastic Strain (%) |
|---|---|---|---|---|---|---|
| K7DP-1 | 1300/2 h/FC | RT | 405.2 | 504.1 | 0.48 | 2.4 |
| K7DP-1 | same | 870 | 321.5 | 339.5 | 0.52 | 94.0 |
| K7DP-2 | 1300/2 h/AC | RT | 430.2 | 525.0 | 0.53 | 2.2 |
| K7DP-2 | same | 870 | 324.0 | 341.0 | 0.54 | 84.0 |
| K7TMT1 | 1380/12 min/ FC/900/AC | RT | 365.2 | 482.6 | 0.50 | 2.3 |
| K7TMT1 | same | 700 | 319.0 | 470.0 | 0.42 | 3.5 |
| K7TMT1 | same | 870 | 341.0 | 406.5 | 0.63 | 67.0 |
| K7TMT2 | 1380/15 min/ FC/1200/AC | RT | 378.4 | 515.9 | 0.46 | 2.3 |
| K7TMT2 | same | 700 | 324.0 | 508.0 | 0.33 | 3.8 |
| K7TMT2 | same | 870 | 353.5 | 424.0 | 0.65 | 68.0 |
| K7TMT3 | 1390/30 min/ FC | RT | 361.9 | 473.5 | 0.46 | 2.4 |
| K7TMT3 | same | 700 | 310.0 | 457.0 | 0.36 | 3.4 |
| K7TMT3 | same | 870 | 341.0 | 4.4.0 | 0.57 | 78.0 |
| K7TMT4 | 1390/40 min/ FC/1200/AC | RT | 387.7 | 524.3 | 0.43 | 2.2 |
| K7TMT4 | same | 700 | 299.0 | 451.0 | 0.41 | 2.8 |
| K7TMT4 | same | 870 | 341.5 | 421.0 | 0.56 | 60.0 |
| K7TMT5 | 1295/10 min/ 1370/2 min/ AC/30s/WQ | RT | 554.0 | | | |
| K7TMT6 | 1275/10 min/ 1370/5 min/ AC/2 min/WQ | RT | 484.0 | | | |

Examination of the above data reveals that duplex materials have higher yield strength levels at RT, but TMT microstructures exhibit higher tensile strengths. The trend is consistent with variations in lamellar spacing which decrease with increased cooling rate. One remarkable feature in TMT material is that in spite of the relatively coarse grain size (150–250 $\mu$m), it exhibits excellent tensile ductility at RT, 2.6–2.9%, approximately the same as that of fine-grained (5–15 $\mu$m) duplex material.

Table III, below, lists tensile properties of forged alloys K1 (0.2 B containing) and K2 (0.28 B containing) measured after various heat treatments for producing several microstructures.

TABLE III

Heat Treatments vs Tensile Properties of Alloys K1 and K2 at SR = $1 \times 10^{-3}s^{-1}$

| | Heat Treatment (° C./Time/Cooling) | Test T (° C.) | YS (Mpa) | UTS (Mpa) | Yield Strain (%) | Plastic Strain (%) |
|---|---|---|---|---|---|---|
| K1NG-1 | 1100/4 h/FC/700/FC | RT | 398.0 | 454.0 | 0.42 | 0.8 |
| K1DP-1 | 1300/2 h/FC/700/FC | RT | 435.9 | 470.5 | 0.43 | 1.0 |
| K1NL-1 | 1355/40 MIN/FC/700/AC | RT | 400.0 | 483.5 | 0.41 | 1.1 |
| K1TMT-1 | 1370/1 h/FC/700/AC | RT | 412.0 | 477.5 | 0.45 | 0.7 |
| K2NG-1 | 1100/4 h/FC/700/AC | RT | 528.0 | 573.0 | 0.46 | 1.2 |
| K2DP-1 | 1300/2 h/FC/700/AC | RT | 462.5 | 557.0 | 0.45 | 1.5 |
| K2DP-2 | 1300/1 h/FC/1000/AC | RT | 490.1 | 507.8 | 0.49 | 0.6 |
| K2DP-2 | 1300/1 h/FC/1000/AC | 800 | 379.0 | 434.0 | 0.53 | 1.1 |
| K2DP-2 | 1300/1 h/FC/1000/AC | 1000 | 226.0 | 228.0 | 0.59 | 16.6 |
| K2TMT-1 | 1370/30 m/FC/700/AC | RT | 429.0 | 528.0 | 0.42 | 1.2 |
| K2TMT-2 | 1385/1 h/FC/700/AC | RT | 411.5 | 531.0 | 0.45 | 1.6 |
| K2TMT-3 | 1360/1 h/FC/1200/AC | RT | 369.0 | 463.0 | 0.37 | 1.1 |
| K2TMT-3 | 1360/1 h/FC/1200/AC | 600 | 339.0 | 458.0 | 0.49 | 1.6 |
| K2TMT-3 | 1360/1 h/FC/1200/AC | 800 | 330.0 | 487.0 | 0.45 | 4.1 |
| K2TMT-3 | 1360/1 h/FC/1200/AC | 1000 | 262.5 | 276.5 | 0.58 | 7.8 |

The data shows trends similar to those described for alloy K7, although the strength levels are generally higher than for alloy K7. These increased strength levels are believed to be due to higher boron contents as well as higher alloying elements. The beneficial effect of boron on ductility is still present for these high boron-containing alloys.

By incorporating this invention as the intermediate step in hot working processes for producing fine grained duplex mill products, and then as the last step after component forming operations for producing the final nearly-lamellar or refined fully TMT lamellar product, manufacturers will be able to produce parts or components, with widely varying section sizes, made of the new gamma titanium aluminide alloys. Such components offer significant advantages for advanced, high-temperature aerospace applications which require improved specific properties, such as tensile, creep, fatigue and fracture toughness, or an improved balance of the gamma alloy specific properties. Preliminary mechanical test results show that the duplex microstructure can enhance the high-temperature tensile elongation at least by 50%, and lead to superplastically formable alloys. Nearly-lamellar microstructures yield excellent tensile strengths higher than those of duplex by at least 20% while maintaining the good ductility. Refined fully TMT lamellar structures yield balances in properties considerably improved over those of conventional fully-lamellar structures by more than 20%.

Various modifications may be made to the invention as described without departing from the spirit of the invention or the scope of the appended claims.

We claim:

1. A process for producing duplex microstructure in an article of gamma titanium aluminide alloy containing 0.05 to 1.0 atomic percent boron, which comprises the steps of:

(a) hot working the article;

(b) annealing the hot worked article at an annealing temperature in the range of $T_e$+100° C. to $T_\alpha$−25° C. for about 10 minutes to 15 hours;

(c) cooling said article from said annealing temperature to a preselected temperature between said annealing temperature and about 700° C. at a first cooling rate of about 10° to 1000° C./min and then cooled at a second rate ranging from said first cooling rate to water quenching to room temperature, and (d) aging the so cooled article at an aging temperature in the range of 700° to 1050° C. for about 1 to 150 hours.

2. The process of claim 1 wherein said alloy has the composition Ti-(45.0–49)Al-(0–3)X-(0–6)Y-(0.05–1.0)B wherein X is Cr, Mn, V or any combination thereof, and Y is Nb, Ta, W, Mo, Zr, Hf, or any combination thereof.

3. The process of claim 2 wherein said alloy has the composition Ti-(46–47.5)Al-(1–3)Cr-(2–4)Nb-(0–0.3)W-(0.1–0.5)B.

4. A process for producing duplex microstructure in an article of gamma titanium aluminide alloy containing 0.05 to 1.0 atomic percent boron, which comprises the steps of:

(a) hot working the article;

(b) annealing the hot worked article at an annealing temperature in the range of $T_e$+100° C. to $T_\alpha$−25° C. for about 10 minutes to 15 hours;

(c) cooling said article from said annealing temperature to an aging temperature in the range of 700° to 1050° C. at a cooling rate of about 5° to 1000° C./min; and (d) aging the so cooled article at said aging temperature for about 1 to 150 hours.

5. The process of claim 4 wherein said alloy has the composition Ti-(45.0–49)Al-(0–3)X-(0–6)Y-(0.05–1.0)B wherein X is Cr, Mn, V or any combination thereof, and Y is Nb, Ta, W, Mo, Zr, Hf, or any combination thereof.

6. The process of claim 5 wherein said alloy has the composition Ti-(46–47.5)Al-(1–3)Cr-(2–4)Nb-(0–0.3)W-(0.1–0.5)B.

7. A process for producing nearly-lamellar microstructure in an article of gamma titanium aluminide alloy containing 0.05 to 1.0 atomic percent boron, which comprises the steps of:

(a) hot working the article;

(b) annealing the hot worked article at an annealing temperature in the range of $T_\alpha$−1° C. to $T_\alpha$−25° C. for about 0.5 to 10 hours;

(c) cooling said article from said annealing temperature to a preselected temperature between said annealing temperature and about 700° C. at a first cooling rate of about 5° to 1000° C./min and then cooled at a second rate ranging from said first cooling rate to water quenching to room temperature; and (d) aging the so cooled article at an aging temperature in the range of 700° to 1050° C. for about 1 to 150 hours.

8. The process of claim 7 wherein said alloy has the composition Ti-(45.0–49)Al-(0–3)X-(0–6)Y-(0.05–1.0)B wherein X is Cr, Mn, V or any combination thereof, and Y is Nb, Ta, W, Mo, Zr, Hf, or any combination thereof.

9. The process of claim 8 wherein said alloy has the composition Ti-(46–47.5)Al-(1–3)Cr-(2–4)Nb-(0–0.3)W-(0.1–0.5)B.

10. A process for producing nearly-lamellar microstructure in an article of gamma titanium aluminide alloy containing 0.05 to 1.0 atomic percent boron, which comprises the steps of:

(a) hot working the article;

(b) annealing the hot worked article at an annealing temperature in the range of $T_\alpha$−1° C. to $T_\alpha$−25° C. for about 0.5 to 10 hours;

(c) cooling said article from said annealing temperature to an aging temperature in the range of 700° to 1050° C. at a cooling rate of about 5° to 1000° C./min; and (d) aging the so cooled article at said aging temperature for about 1 to 150 hours.

11. The process of claim 10 wherein said alloy has the composition Ti-(45.0–49)Al-(0–3)X-(0–6)Y-(0.05–1.0)B wherein X is Cr, Mn, V or any combination thereof, and Y is Nb, Ta, W, Mo, Zr, Hf, or any combination thereof.

12. The process of claim 11 wherein said alloy has the composition Ti-(46–47.5)Al-(1–3)Cr-(2–4)Nb-(0–0.3)W-(0.1–0.5)B.

13. A process for producing fully TMT lamellar microstructure in an article of gamma titanium aluminide alloy containing 0.05 to 1.0 atomic percent boron, which comprises the steps of:

(a) hot working the article;

(b) pre-annealing the hot worked article at a temperature in the range of $T_\alpha$−12 C. to $T_\alpha$−100° C. for about 1 minute to 2 hours;

(c) heating the pre-annealed article to annealing temperature at a rate greater then 20° C./min;

(d) annealing the hot worked article at an annealing temperature in the range of $T_\alpha$ to $T_\alpha$+60° C. for about 1 minute to 10 hours;

(e) cooling said article from said annealing temperature to a preselected temperature between said annealing temperature and about 700° C. at a first cooling rate of about 5° to 1000° C./min and then cooled at a second rate ranging from said first cooling rate to water quenching to room temperature; and (f) aging the cooled article at an aging temperature in the range of 700° to 1050° C. for about 1 to 150 hours.

14. The process of claim 13 wherein said alloy has the composition Ti-(45.0–49)Al-(0–3)X-(0–6)Y-(0.05–1.0)B wherein X is Cr, Mn, V or any combination thereof, and Y is Nb, Ta, W, Mo, Zr, Hf, or any combination thereof.

15. The process of claim 14 wherein said alloy has the composition Ti-(46–47.5)Al-(1–3)Cr-(2–4)Nb-(0–0.3)W-(0.1–0.5)B.

16. A process for producing fully TMT lamellar microstructure in an article of gamma titanium aluminide alloy containing 0.05 to 1.0 atomic percent boron, which comprises the steps of:

(a) hot working the article;

(b) pre-annealing the hot worked article at a temperature in the range of $T_\alpha$−1° C. to $T_\alpha$−100° C. for about 1 minute to 2 hours;

(c) heating the pre-annealed article to annealing temperature at a rate greater than 20° C./min;

(d) annealing the hot worked article at an annealing temperature in the range of $T_\alpha$ to $T_\alpha$+60° C. for about 1 minute to 10 hours;

(e) cooling said article from said annealing temperature to an aging temperature in the range of 700° to 1050° C. at a cooling rate of about 5° to 1000° C./min; and (f) aging the cooled article at said aging temperature for about 1 to 150 hours.

17. The process of claim 16 wherein said alloy has the composition Ti-(45.0–49)Al-(0–3)X-(0–6)Y-(0.05–1.0)B wherein X is Cr, Mn, V or any combination thereof, and Y is Nb, Ta, W, Mo, Zr, Hf, or any combination thereof.

18. The process of claim 17 wherein said alloy has the composition Ti-(46–47.5)Al-(1–3)Cr-(2–4)Nb-(0–0.3)W-(0.1–0.5)B.

19. A process for producing fully lamellar microstructure in an article of gamma titanium aluminide alloy containing 0.05 to 1.0 atomic percent boron, which comprises the steps of:

(a) hot working the article;

(b) heating the said article to annealing temperature at a rate greater than 20° C./min;

(c) annealing the hot worked article at an annealing temperature in the range of $T_\alpha$ to $T_\alpha$+60° C. for about 1 minute to 10 hours;

(d) cooling said article from said annealing temperature to a preselected temperature between said annealing temperature and about 700° C. at a first cooling rate of about 5° to 1000° C./min and then cooled at a second rate ranging from said first cooling rate to water quenching to room temperature; and (e) aging the cooled article at an aging temperature in the range of 700° to 1050° C. for about 1 to 150 hours.

20. The process of claim 19 wherein said alloy has the composition Ti-(45.0–49)Al-(0–3)X-(0–6)Y-(0.05–1.0)B wherein X is Cr, Mn, V or any combination thereof, and Y is Nb, Ta, W, Mo, Zr, Hf, or any combination thereof.

21. The process of claim 20 wherein said alloy has the composition Ti-(46–47.5)Al-(1–3)Cr-(2–4)Nb-(0–0.3)W-(0.1–0.5)B.

22. A process for producing fully lamellar microstructure in an article of gamma titanium aluminide alloy containing 0.05 to 1.0 atomic percent boron, which comprises the steps of:

(a) hot working the article;

(b) heating the said article to annealing temperature at a rate greater than 20° C./min;

(c) annealing the hot worked article at an annealing temperature in the range of $T_\alpha$ to $T_\alpha$+60° C. for about 1 minute to 10 hours;

(d) cooling said article from said annealing temperature to an aging temperature in the range of 700° to 1050° C. at a cooling rate of about 5° to 1000° C./min; and (e) aging the cooled article at said aging temperature for about 1 to 150 hours.

23. The process of claim 22 wherein said alloy has the composition Ti-(45.0–49)Al-(0–3)X-(0–6)Y-(0.05–1.0)B wherein X is Cr, Mn, V or any combination thereof, and Y is Nb, Ta, W, Mo, Zr, Hf, or any combination thereof.

24. The process of claim 23 wherein said alloy has the composition Ti-(46–47.5)Al-(1–3)Cr-(2–4)Nb-(0–0.3)W-(0.1–0.5)B.

* * * * *